(12) United States Patent
Vaishnavi et al.

(10) Patent No.: US 12,020,889 B2
(45) Date of Patent: Jun. 25, 2024

(54) INTERLOCK MECHANISM FOR A DISTRIBUTION CABINET

(71) Applicant: Eaton Intelligent Power Limited, Dublin (IE)

(72) Inventors: Romil Vaishnavi, Pune (IN); Prashant Savgave, Undri Pune (IN); Arthur James Jur, Cleveland, TN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 370 days.

(21) Appl. No.: 17/341,007

(22) Filed: Jun. 7, 2021

(65) Prior Publication Data

US 2022/0392719 A1    Dec. 8, 2022

(51) Int. Cl.
*H01H 9/22*  (2006.01)
*E05C 9/04*  (2006.01)

(52) U.S. Cl.
CPC .............. *H01H 9/22* (2013.01); *E05C 9/043* (2013.01); *E05C 9/048* (2013.01)

(58) Field of Classification Search
CPC   H01H 9/22; H01H 9/20; H01H 21/06; H01H 9/10; H01H 9/04; H01H 25/00; E05C 9/043; E05C 9/06; H02B 11/133; H02B 1/20; H05K 5/02
USPC .......... 200/50.32, 50.33, 50.4, 318; 361/632, 361/631, 634, 635, 643
See application file for complete search history.

(56) References Cited

U.S. PATENT DOCUMENTS

| | | | |
|---|---|---|---|
| 4,405,844 A * | 9/1983 | Dizon | H01H 21/06 200/50.12 |
| 9,922,785 B2 * | 3/2018 | Jur | H01H 9/22 |
| 10,319,544 B2 | 6/2019 | Vaishnavi et al. | |

* cited by examiner

*Primary Examiner* — Renee S Luebke
*Assistant Examiner* — Iman Malakooti
(74) *Attorney, Agent, or Firm* — Merchant & Gould P.C.

(57) ABSTRACT

The present disclosure relates to an interlock mechanism for automatically locking and unlocking a lock system of an electrical cabinet based on the state of bolted pressure contact switches housed within the electrical cabinet.

21 Claims, 14 Drawing Sheets

INTERLOCK MECHANISM FOR A DISTRIBUTION CABINET

TECHNICAL FIELD

The present disclosure relates to electric switch assemblies housed within high voltage switchgear enclosures. More specifically, the present disclosure relates to a locking mechanism for use with high voltage switchgear enclosures.

BACKGROUND

Electrical devices, such as bolted pressure contact switches, can be enclosed in electrical cabinets that have an operating handle located on a door or cover of the electrical cabinet. A device operating mechanism is typically located inside the electrical cabinet for switching the contact switches between ON and OFF positions. It is known that in certain situations the door of the electrical cabinet can be opened while the contact switches are closed or in the ON position.

Improvements are needed to enhance safety features for electrical devices activated within an electrical cabinet.

SUMMARY

Aspects of the present disclosure relate to an interlock mechanism for automatically locking and unlocking an access door of an electrical cabinet based on the state of bolted pressure contact switches housed within the electrical cabinet.

Due to the action of the interlock mechanism, the electrical cabinet may be provided with safety features whereby the state of the switch itself either prohibits or permits access inside the electrical cabinet. That is, the access door of the electrical cabinet can be unlocked or locked due to the action of interlock mechanism according to the present disclosure. The door can be automatically locked when the contact switches are moved to their closed state and the door can be automatically unlocked when the contact switches are moved to their open state.

The interlock mechanism can be mounted within the electrical cabinet and be connected to a switch operating mechanism so as to cooperate therewith and move between positions corresponding respectively to the closed and open positions of the contact switches.

Aspects of the present disclosure relate to an automatic interlock assembly for use within an electrical cabinet including an access door. The electrical cabinet can include contact switches and a switch actuator mechanism operatively interconnected with the contact switches to shift the contact switches between OPEN and CLOSED conditions. The automatic interlock assembly can include a lock system mounted in the electrical housing. The lock system can include a slider rod and a linkage. The slider rod can have a first end and an opposite second end. The slider rod can be movable between an extended position and a retracted position.

The automatic interlock assembly can include a multi-position arm mounted within the electrical cabinet. The multi-position arm can be in releasable contact with the linkage of the lock system. The multi-position arm can be operable between a first position and a second position that respectively correspond with the OPEN and CLOSED conditions of the contact switches.

The automatic interlock assembly can include a door assembly mounted on the access door. The door assembly can include a door bracket and a hook bracket mounted to the door bracket. The hook bracket can be received within an opening defined in the slider rod when the access door is closed.

When the multi-position arm moves with the switch actuator mechanism from the CLOSED condition to the OPEN condition, the multi-position arm is in the first position to make contact with the linkage. The multi-position arm pushes the linkage upward and holds the slider rod in the extended position. The hook bracket is configured to move without obstruction within the opening of the slider rod such that the lock system remains unlocked.

When the multi-position arm moves with the switch actuator mechanism from the OPEN condition to the CLOSED condition, the slider rod and the linkage follow the multi-position arm downwardly as the multi-position arm moves to the second position. The multi-position arm separates from the linkage to permit the slider rod to linearly move to the retracted position. The hook bracket can be restricted by a leg of the slider rod from moving out of the opening such that the lock system locks.

These and other features and advantages will be apparent from a reading of the following detailed description and a review of the associated drawings. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Electrical switches are often used as a main disconnect for commercial and industrial applications. Electrical switches are typically housed within electrical cabinets or boxes. Traditionally, an external handle is mounted on the electrical cabinets. The handle can be connected to an actuator mechanism within the cabinet such that when the handle is pivoted by a user, mechanical energy to the actuator mechanism actuates the electrical switches to safely make or break circuit current through the switches to ensure electrical connection and disconnection of the circuit.

Figure 1:
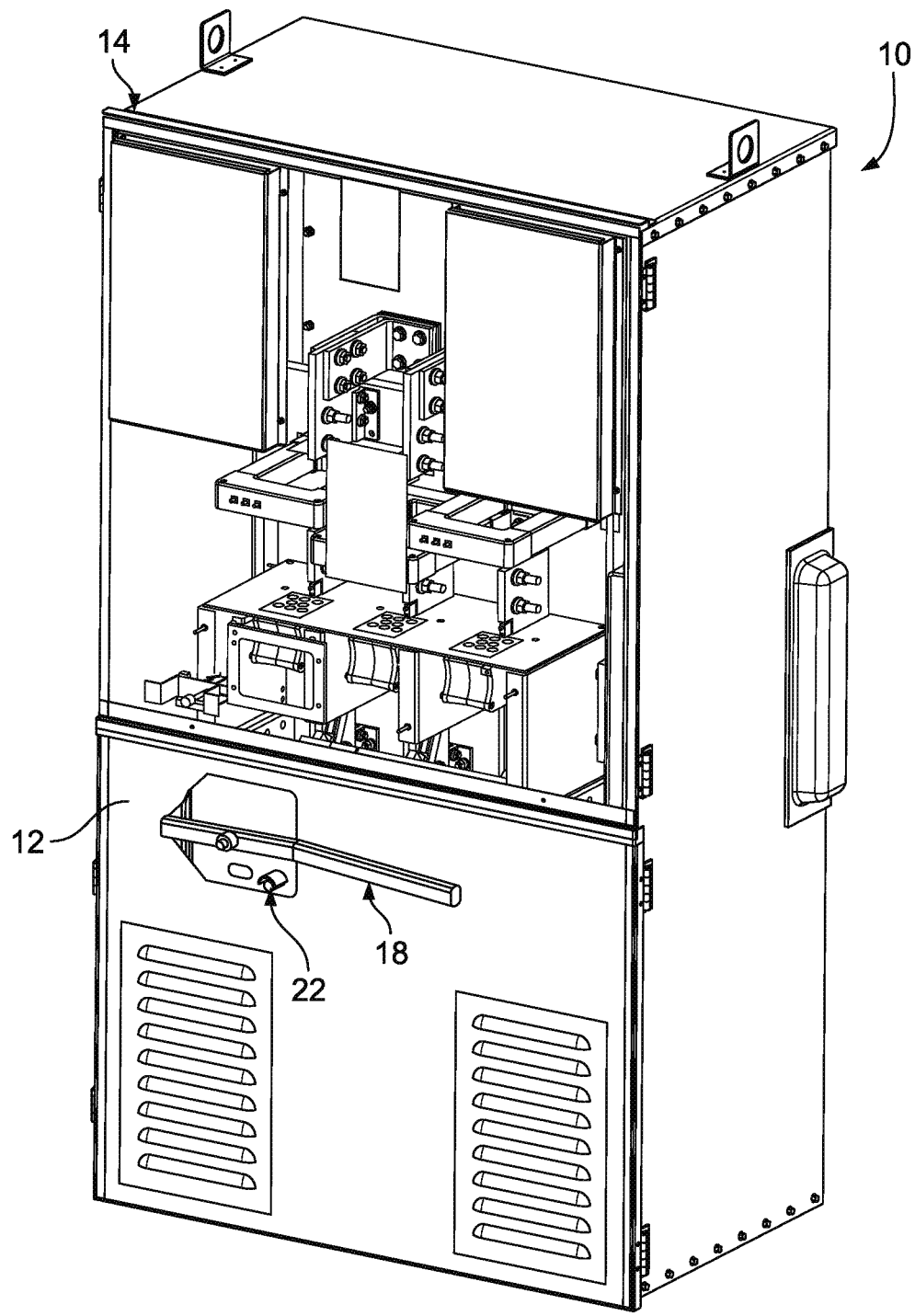
FIG. 1 illustrates a perspective view of an example electrical cabinet including a door with a control handle in accordance with principles of the present disclosure.

FIG. 1 the shows an electrical cabinet 10. While the example embodiment discussed herein is with reference to the electrical cabinet 10, other types of closures (e.g., electrical boxes, junction boxes, control panels, lighting panels, motor control centers, switchgear housings, relay cabinets) or any other type of closure (e.g., a flame-proof enclosure) may be used. An access door 12 can be hingedly connected to a door frame 14 by one or more hinges 16. The access door 12 can swing freely on the hinges 16 when the door 12 is unlocked. The access door 12 incorporates a door handle 18 shown fixed on an outer surface 20 of the access door 12. The electrical cabinet 10 may further incorporate a trip device 22 in the form of a push button, rotational button or key.

Figure 2:
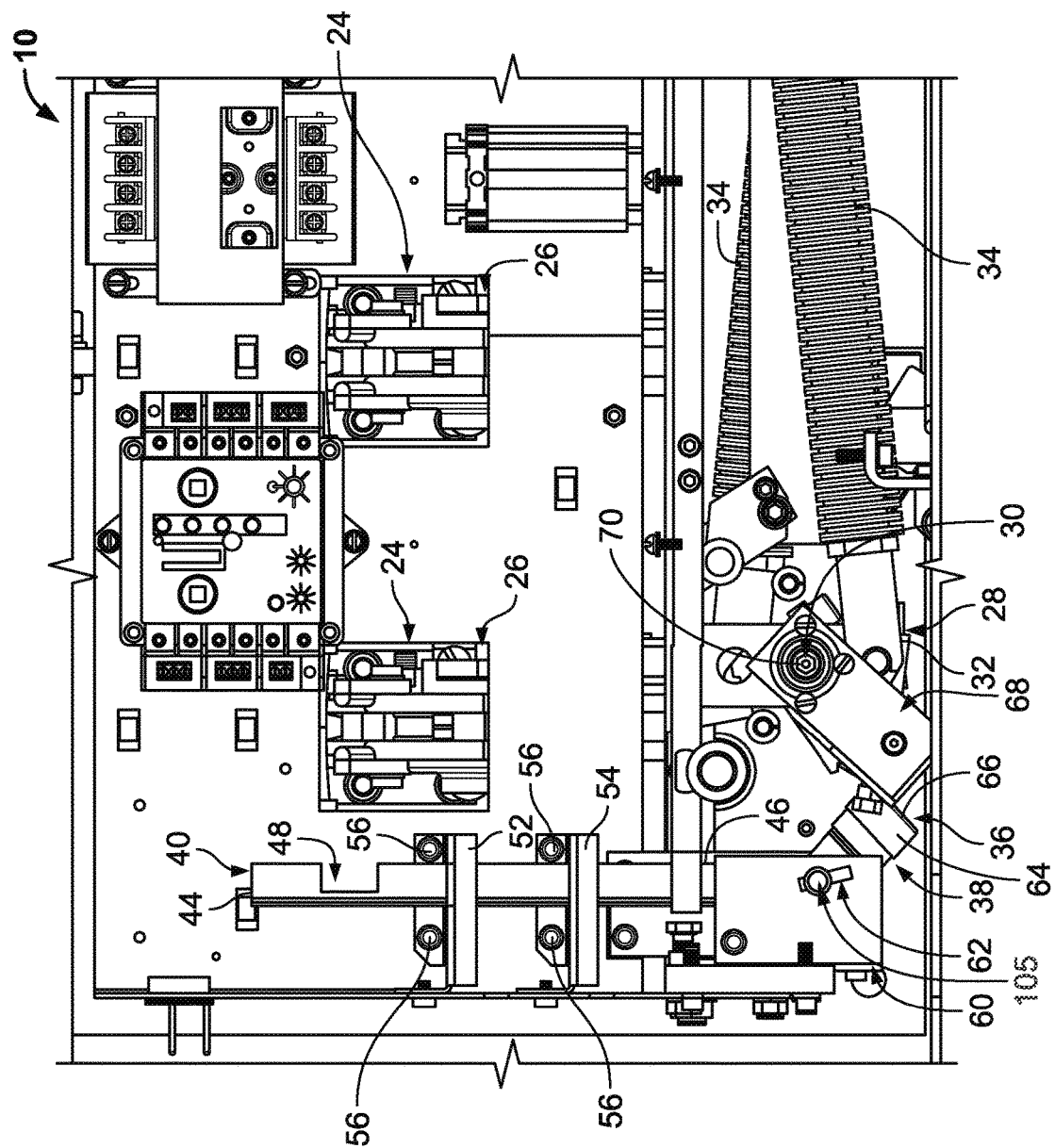
FIG. 2 illustrates a front view of the electrical cabinet with the door removed to show an interlock assembly and a switch control mechanism in an OFF position in accordance with the principles of the present disclosure.

Referring to FIG. 2, the electrical cabinet 10 includes an electrical switch assembly 24 known as a bolted pressure switch assembly. As shown, the electrical switch assembly 24 includes two sets of electrical contacts 26 (e.g., contact switches), although alternatives are possible. In certain examples, the electrical switch assembly 24 may include three sets of electrical contacts. The electrical switch assembly 24 is configured to pivot from an OPEN condition where there is no electrical contact to a CLOSED condition where there is electrical contact. An example switch assembly is disclosed in U.S. Pat. No. 10,319,544, which is incorporated herein by reference in its entirety.

A switch actuator mechanism 28 can be mounted within the electrical cabinet 10. The switch actuator mechanism 28 can be operatively interconnected with the electrical switch assembly 24. The switch actuator mechanism 28 can be manually operated by the door handle 18 for shifting the electrical switch assembly 24 between the OPEN (e.g., OFF position) and CLOSED (e.g., ON position) conditions. An example actuator mechanism is disclosed in U.S. Pat. No. 10,319,544, which is incorporated herein by reference in its entirety.

The switch actuator mechanism 28 can include an actuator 30, a cam assembly 32 and a pair of springs 34. The cam assembly 32 acts between the actuator 30 and the springs 34 to store and release energy in the springs 34. During operation, the actuator 30 can be rotated manually using the door handle 18 from a first position to a second position, although alternatives are possible. In certain examples, the actuator 30 may be moved automatically.

When the actuator 30 is rotated toward the second position, the cam assembly 32 first compresses one of the springs 34, and then latches the compressed spring 34 in a stressed condition. The actuator 30 is next rotated back to the first position such that the compressed spring 34 remains latched, and the cam assembly 32 compresses the other spring 34 to a stressed condition. However, the cam assembly 32 does not latch the other spring 34 in the compressed condition but rather releases the other spring 34 to snap back from the compressed condition. The return movement of the other spring 34 drives the cam assembly 32 to shift the electrical switch assembly 24 from the OPEN condition to the CLOSED condition under the bias of the released spring 34.

The trip device 22 can be configured for releasing the latched spring 34, which then drives the cam assembly 32 to shift the electrical switch assembly 24 back to the OPEN condition in a known manner.

In order to comply with operating standards for high voltage equipment, it is required to lock the access door of electrical cabinets while current is running. That is, when bolted pressure contact switches become electrically energized with live voltages, a locking feature is required to ensure personnel safety. In prior systems, the electrical cabinet 10 would be provided with a lockout bar extending across a front of the access door 12 to indicate when the access door 12 is locked to prevent personnel from opening the access door 12. However, access to the electrical cabinet may still be possible by manually moving the lockout bar.

As noted above, the door handle 18 may serve as an effective means for locking the access door 12 since the door handle 18 may be in a horizontal position when the switch is closed to prohibit access from outside the access door 12. However, in certain examples, the door handle 18 may be removable and no longer prohibit access to the electrical cabinet 10. This situation may create problems for the customer because the electrical state of the contact switch may not be clear. In other examples, the door handle 18 may be in the same position as initially and thus no indication of the ON or OFF position is provided or any restriction of access by the door handle 18.

An automatic interlock assembly in accordance with the principles of the present disclosure is designed to solve the problem described above to ensure that if electrical switches are in an ON condition or closed position, no one can accidently open a door to an electrical box. The automatic interlock assembly allows the door to automatically lock or unlock with the change of state of the electrical switches.

Figure 3:
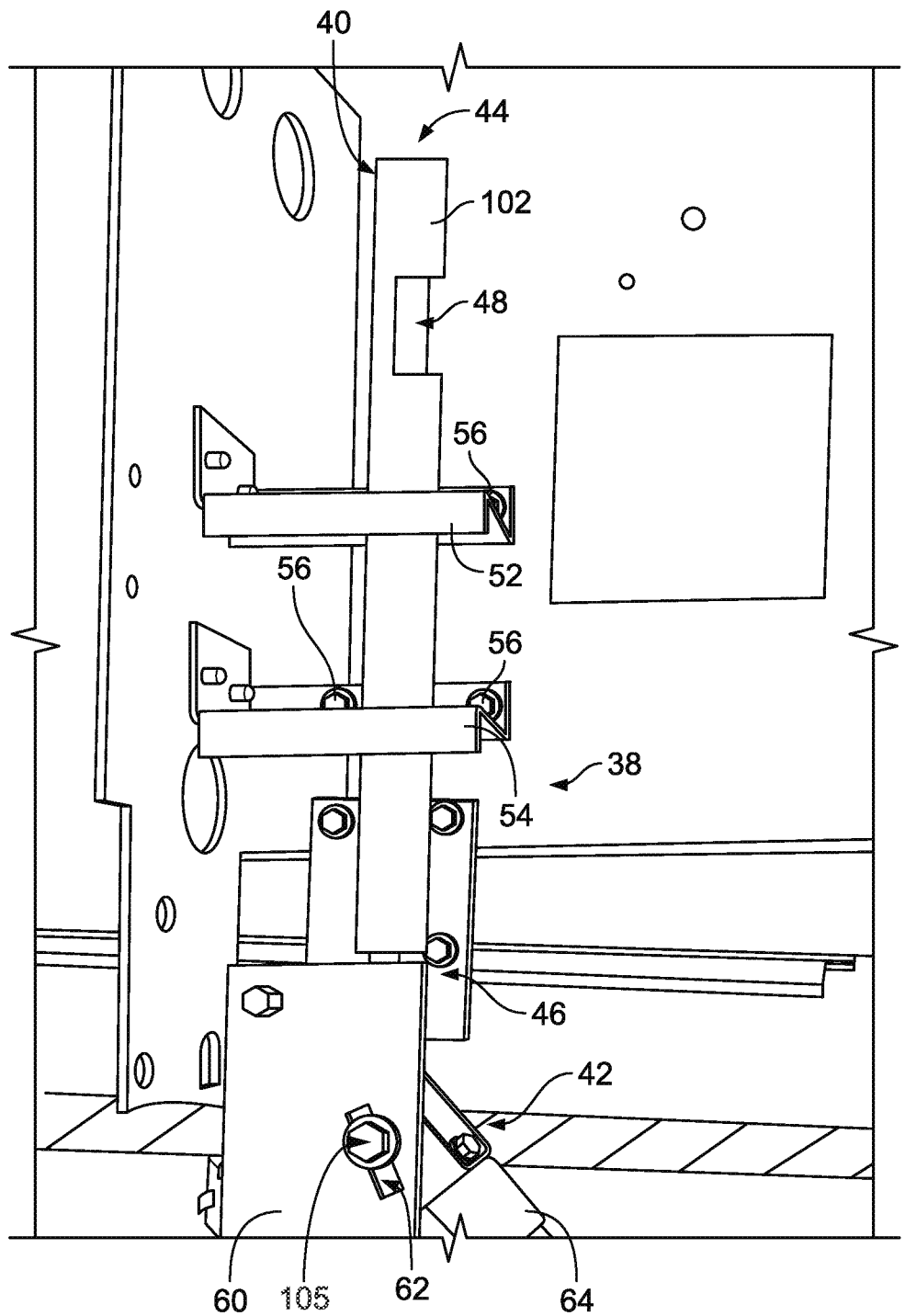
FIG. 3 illustrates a plan view of an automatic interlock assembly in accordance with the principles of the present disclosure.
Figure 4:
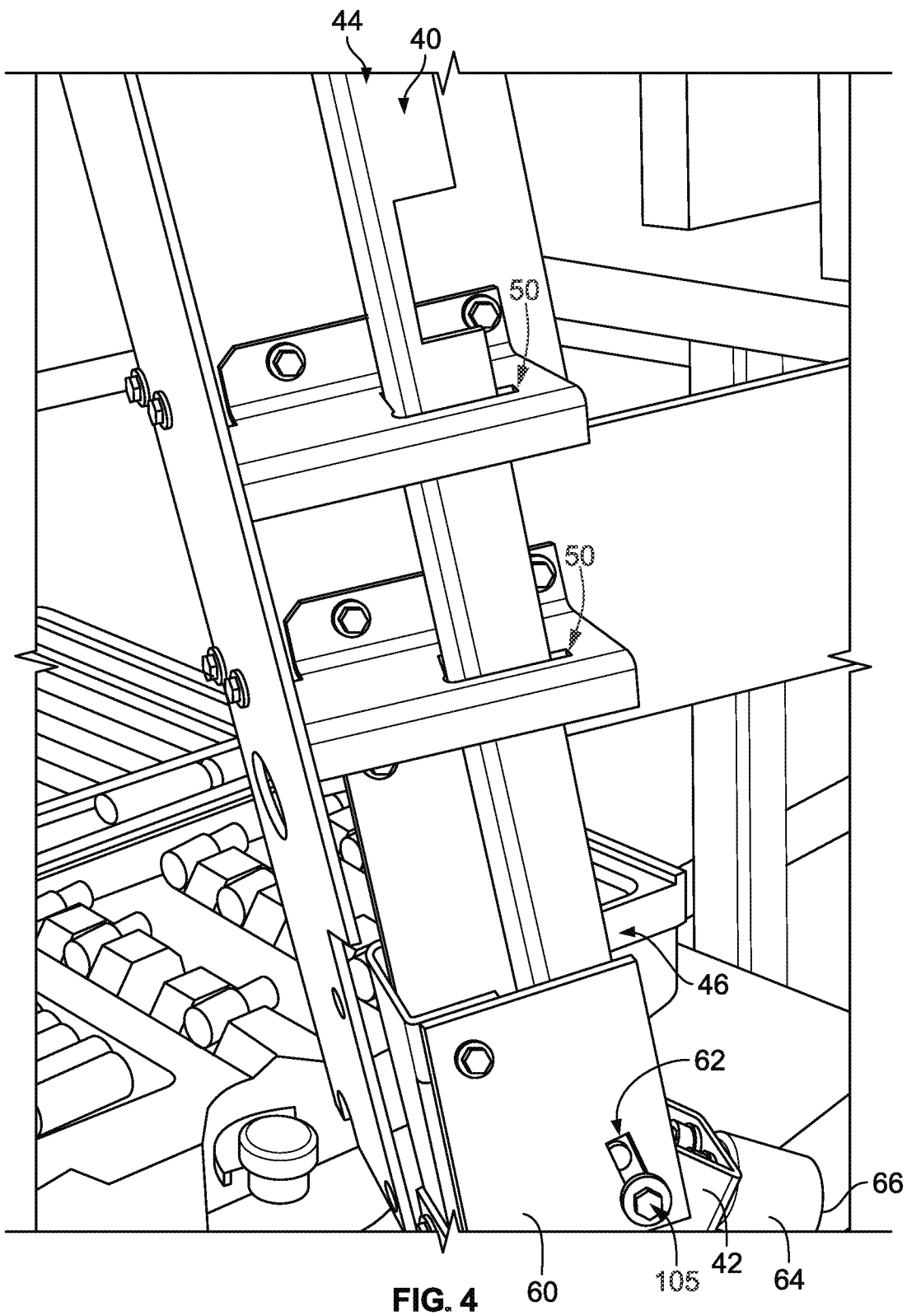
FIG. 4 illustrates another view of the automatic interlock assembly of FIG. 3.

Referring to FIGS. 3-4, the electrical cabinet 10 has an automatic interlock assembly 36 (see FIG. 2). The automatic interlock assembly 36 can include a lock system 38 that is movable between a locked position and an unlocked position. The lock system 38 includes a slider rod 40 and a linkage 42. The slider rod 40 has a first end 44 and an opposite second end 46. The slider rod 40 can be movable between an extended position (e.g., upper or raised position) (see FIG. 3) and a retracted position (e.g., lower position) (see FIG. 4) that respectively correspond with the locked and unlocked positions of the lock system 38.

The slider rod 40 can have a L-shaped transverse cross-section that has a first flat leg 102 that defines an opening 48 (e.g., cutout) and a second flat leg 103 that projects from the first flat leg 102 at a right angle. As the lock system 38 is moved between locked and unlocked positions, the slider rod 40 can slidably move inside L-shaped openings 50 (see FIG. 12) defined by first and second slider brackets 52, 54 between the extended and retracted positions. The first and second slider brackets 52, 54 can be mounted inside the electrical cabinet 10 by fasteners 56. The slider rod 40 can be movable in a linear direction between the extended position and the retracted position.

Turning to FIGS. 13-16, the linkage 42 of the lock system 38 can be connected to the slider rod 40 at the second end 46 for driving the slider rod 40 between its extended and retracted positions. The linkage 42 can be pivotally connected via a pivot structure 58 (e.g., mechanical fastener, stud, linear member, pin, bolt, etc.) to support brackets 60 that are fixed to a side of the frame 14 of the electrical cabinet 10 and are fixed to ground. The pivot structure 58 can include pins 105 that are secured in place by clips 107. The linkage 42 can also be connected to the slider rod 40 via a fastener structure 111 that also includes pins 105 and clips 107. The support brackets 60 can each define a slot 62 for receiving the pins 105. The pins 58 can slidably move within the slots 62 to pivot the linkage 42 relative to the support brackets 60 and thus move the slider rod 40 linearly between its extended and retracted positions. The linkage 42 can also be fixed to an interlock block 64 (e.g., contact member) via pins 105. The interlock block 64 has a contact surface 66.

In certain examples, the contact surface 66 can extend in a plane P (see FIG. 6) that is not parallel with the slider rod 40 of the lock system 38. In certain examples, the interlock block 64 and the slider rod 40 are connected together at an angle of less than 90 degrees, although alternatives are possible.

Figure 5:
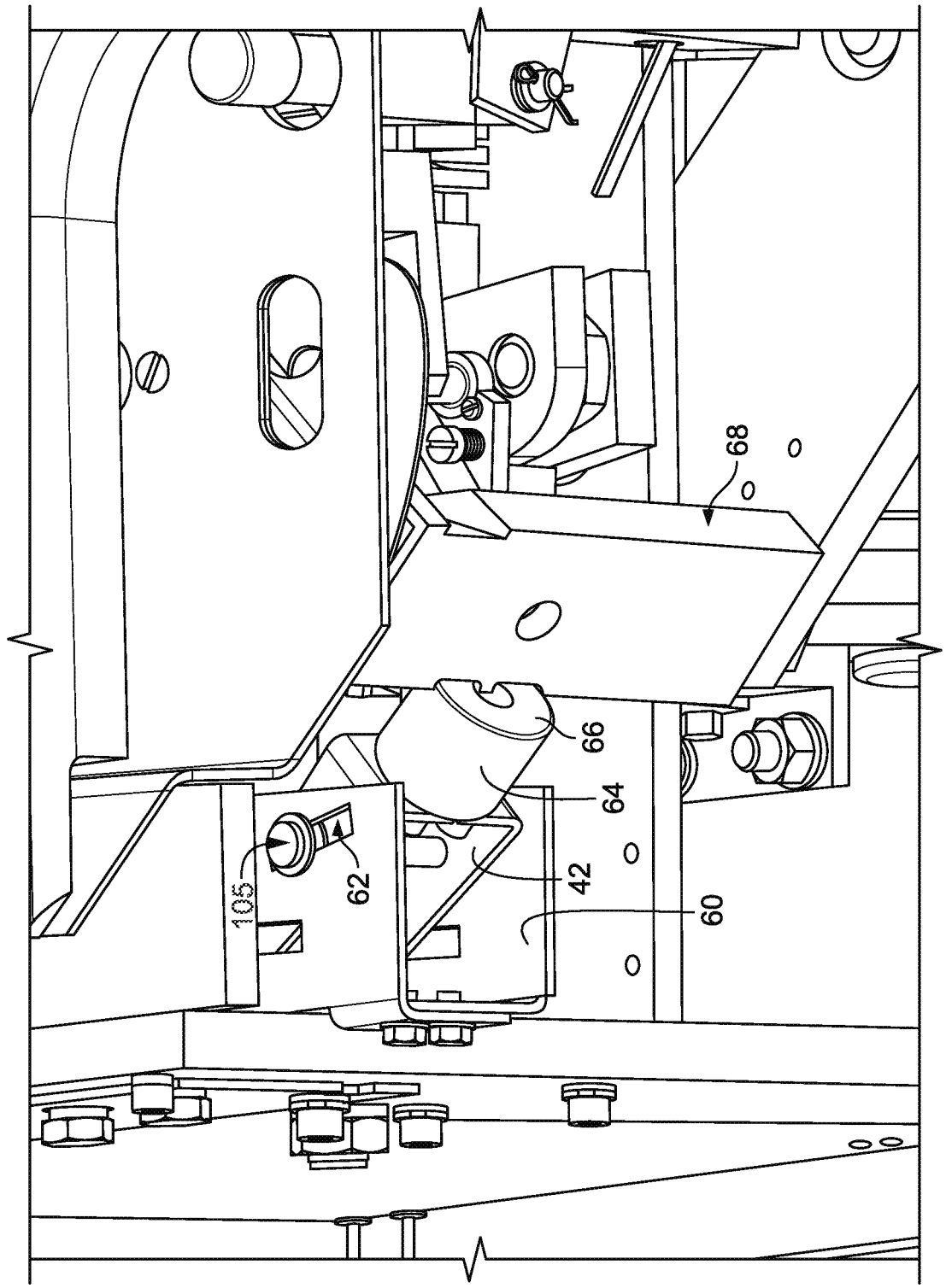
FIG. 5 illustrates a bottom view of the automatic interlock assembly of FIG. 3.
Figure 6:
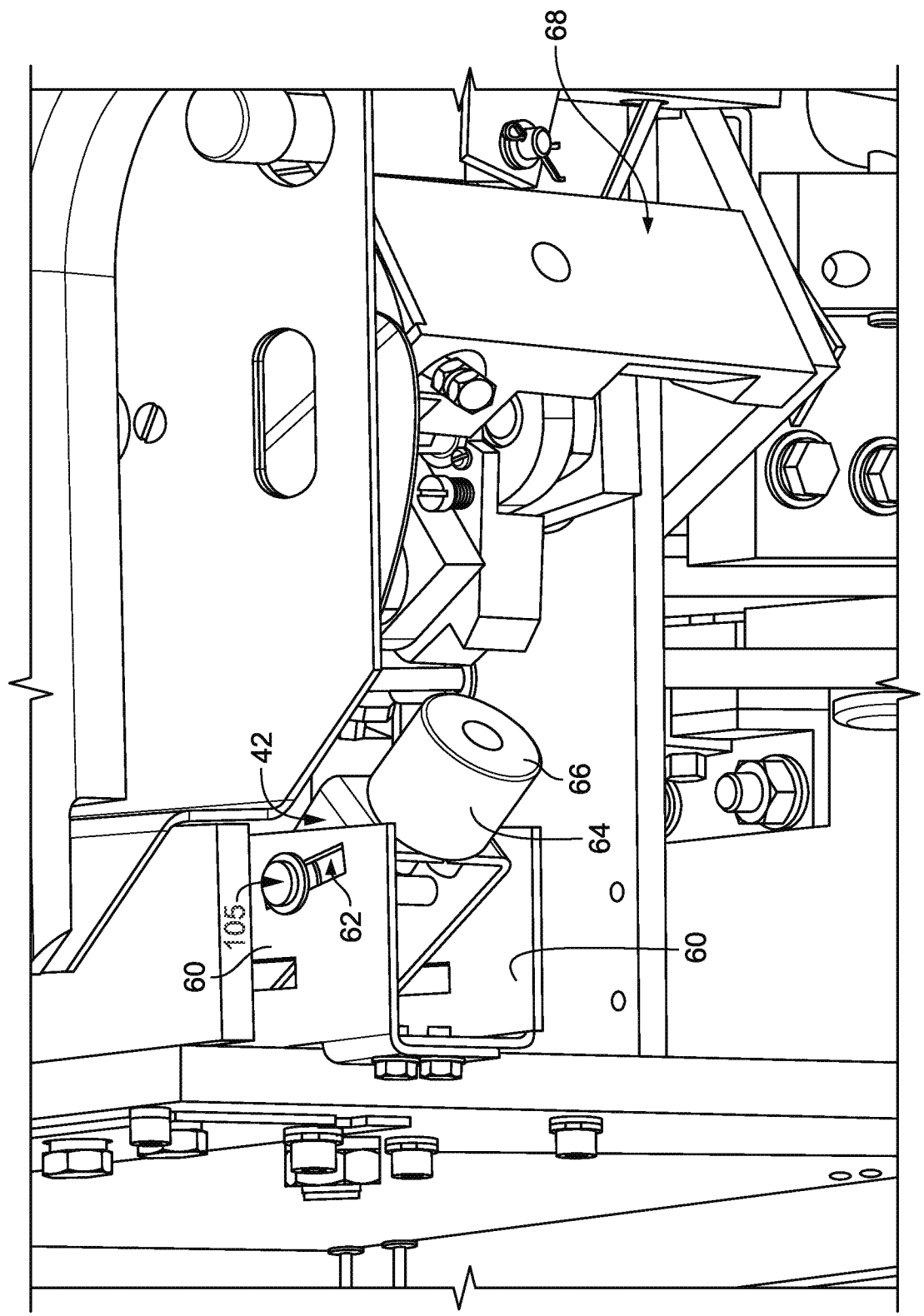
FIG. 6 illustrates another bottom view of the automatic interlock assembly of FIG. 3.
Figure 7:
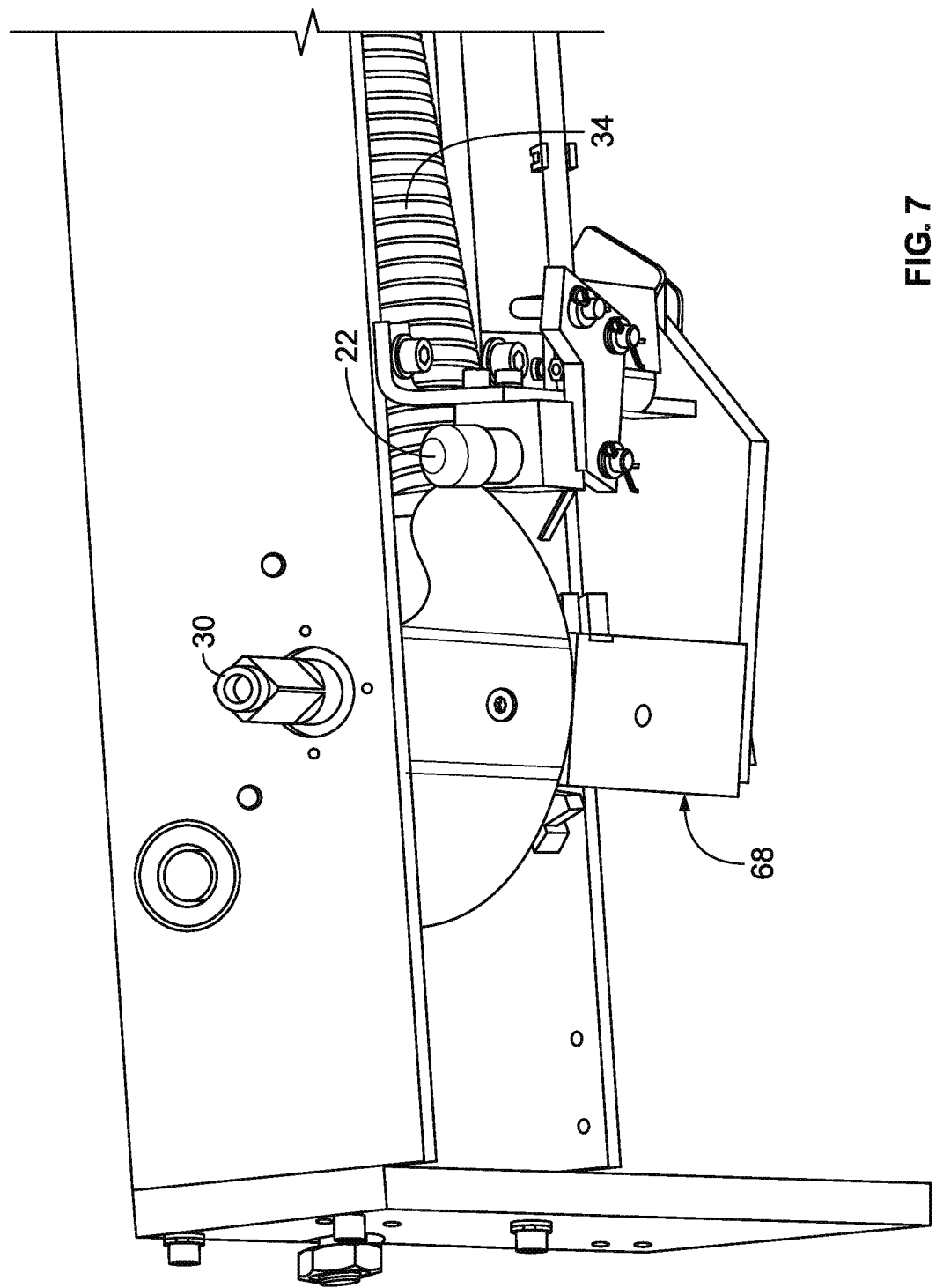
FIG. 7 illustrates an example multi-position arm in accordance with the principles of the present disclosure.
Figure 8:
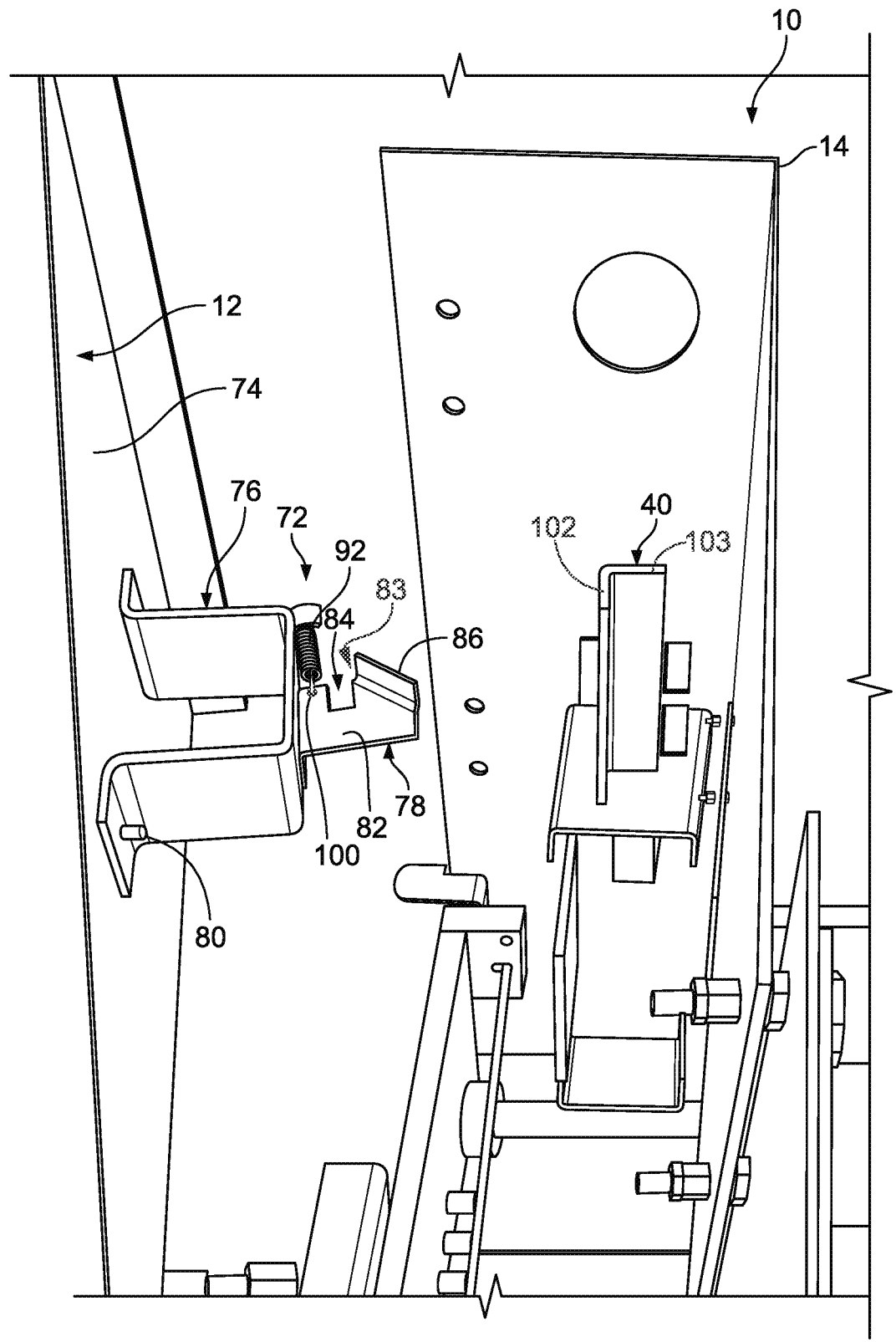
FIG. 8 illustrates an example door assembly including a door bracket and a hook bracket in accordance with the principles of the present disclosure.
Figure 9:
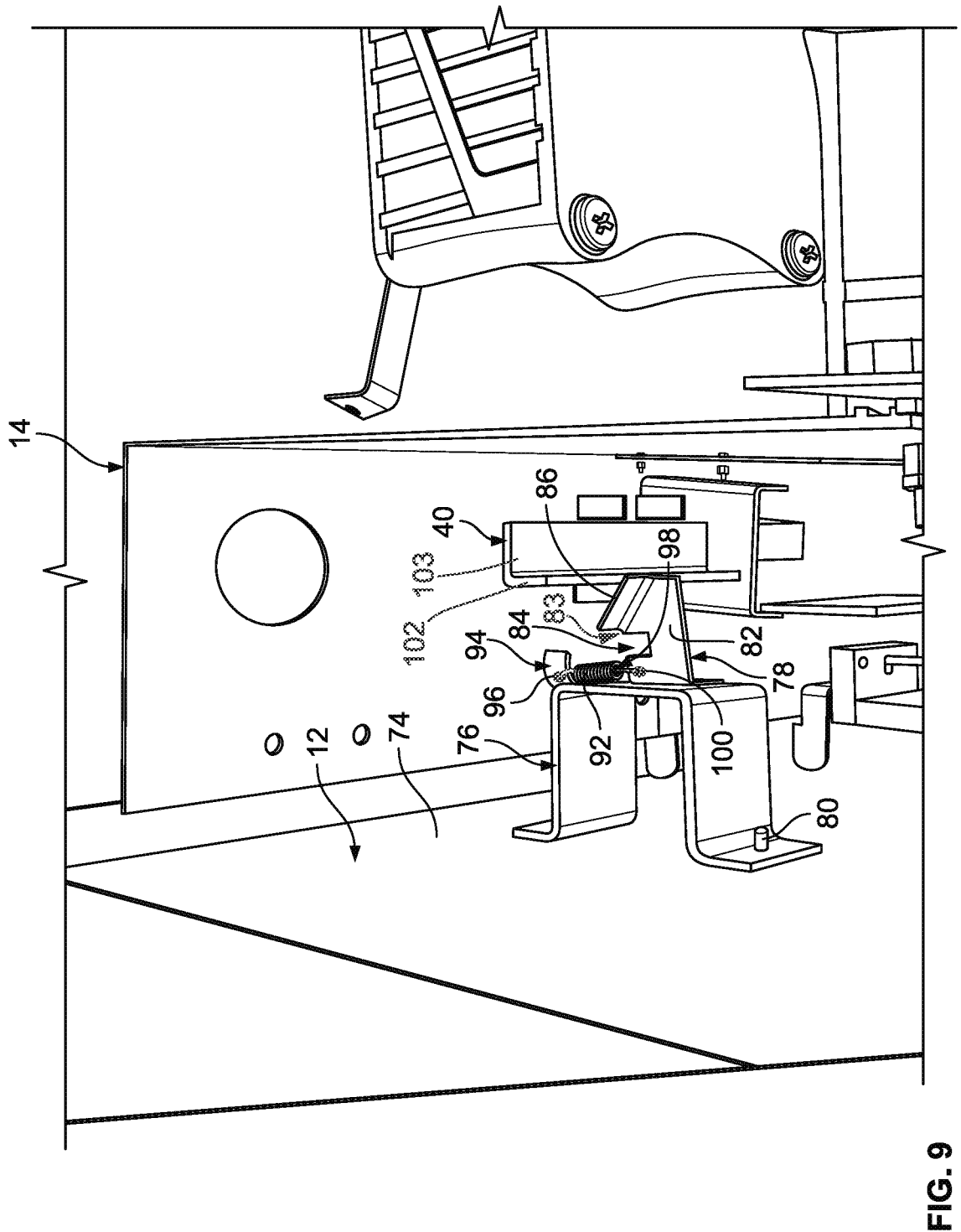
FIG. 9 illustrates another view of the door assembly prior to engaging the automatic interlock assembly.

Turning to FIGS. 5-7, the automatic interlock assembly 36 can include a multi-position arm 68 (e.g., movable element) that can be pivotally interconnected with the cam assembly 32 of the switch actuator mechanism 28 via the actuator 30. As such, the multi-position arm 68 can be operably linked to the door handle 18 for manual operation of the electrical switch assembly 24. That is, the multi-position arm 68 can be movable pivotally about a pivot axis 70 (see FIG. 2) of the actuator 30 between the OPEN (see FIG. 5) and CLOSED conditions (see FIG. 6) via the door handle 18. The multi-position arm being operable between a first position and a second position that respectively correspond with the OPEN and CLOSED conditions of the electrical contacts 26.

During operation, the multi-position arm 68 can be in releasable contact with the linkage 42 of the lock system 38 for automatically operating the lock system 38 while controlling the electrical switch assembly 24. That is, the multi-position arm 68 may directly contact the contact surface 66 of the interlock block 64 to hold the slider rod 40 in the extended position when the electrical switch assembly 24 is in the OPEN condition. The multi-position arm 68 is configured to slidably move the linkage 42 along the slots 62 of the support brackets 60 as the multi-position arm 68 rotates about the pivot axis 70 between the OPEN and CLOSED conditions. That is, the multi-position arm 68 can separate from the contact surface 66 of the interlock block 64 as it moves with the switch actuator mechanism 28 from the OPEN condition to the CLOSED condition. When the multi-position arm 68 moves with the switch actuator mechanism 28 from the CLOSED condition to the OPEN condition, the multi-position arm 68 makes contact with the contact surface 66 and pushes the linkage 42 up along the slots 62 to slide the slider rod 40 up and holds the slider rod 40 in the extended position. When the multi-position arm 68 moves with the switch actuator mechanism 28 from the OPEN condition to the CLOSED condition, the slider rod 40 and the linkage 42 follow the multi-position arm 68 downwardly via gravity until the linkage 42 is stopped by the bottom of the slot 62 in which the multi-position arm 68 then separates from the contact surface 66 as it continues movement toward the CLOSED condition of FIG. 6. In certain examples, the slider rod 40 may be spring loaded for applications requiring horizontal directional movement between the extended and retracted positions.

Referring to FIGS. 8-12, the automatic interlock assembly 36 can further include a door assembly 72 fixed to an inner surface 74 of the access door 12 via fasteners 80. The door assembly 72 can include a door bracket 76 and a hook bracket 78 mounted on the door bracket 76. The hook bracket 78 can include a flange member 82 that defines a slot 84 and an extension member 86 extending from the flange member 82.

The flange member 82 can have a first side 88a (see FIG. 12) and a second side 88b (see FIG. 12) that is parallel to the first side 88a. The flange member 82 can also include a third side 90a and a fourth side 90b. The third and fourth sides can be perpendicular to the first and second sides 88a, 88b. The fourth side 90b of the flange member 82 can define the slot 84. The extension member 86 can be angled relative to the second and fourth sides 88b, 90b. In certain examples, the extension member 86 can be positioned adjacent to the slot 84. The flange member 82 includes a hook portion 83 that defines a portion of the slot 84 and from which the extension member 86 projects.

The hook bracket 78 can be spring loaded by a spring member 92 that has a first end 94 attached to the door bracket 76 via an opening 96 and a second end 98 that is attached to the flange member 82 of the hook bracket 78 via an opening 100 defined therein. The hook bracket 78 can pivot about a pivot axis 79 that extends longitudinally through a latch override actuator 106 (see FIG. 12). The spring member 92 biases the hook bracket 78 to a position about the pivot axis 79 in which the first and second sides 88a, 88b of the flange member 82 are generally horizontal. The extension member 86 projects upwardly from a top side 81 of the flange member 82. The slot 84 extends into the flange member 82 and has an open end at the fourth side 90b and a closed end at an intermediate location between the third and fourth sides 90a, 90b.

Figure 10:
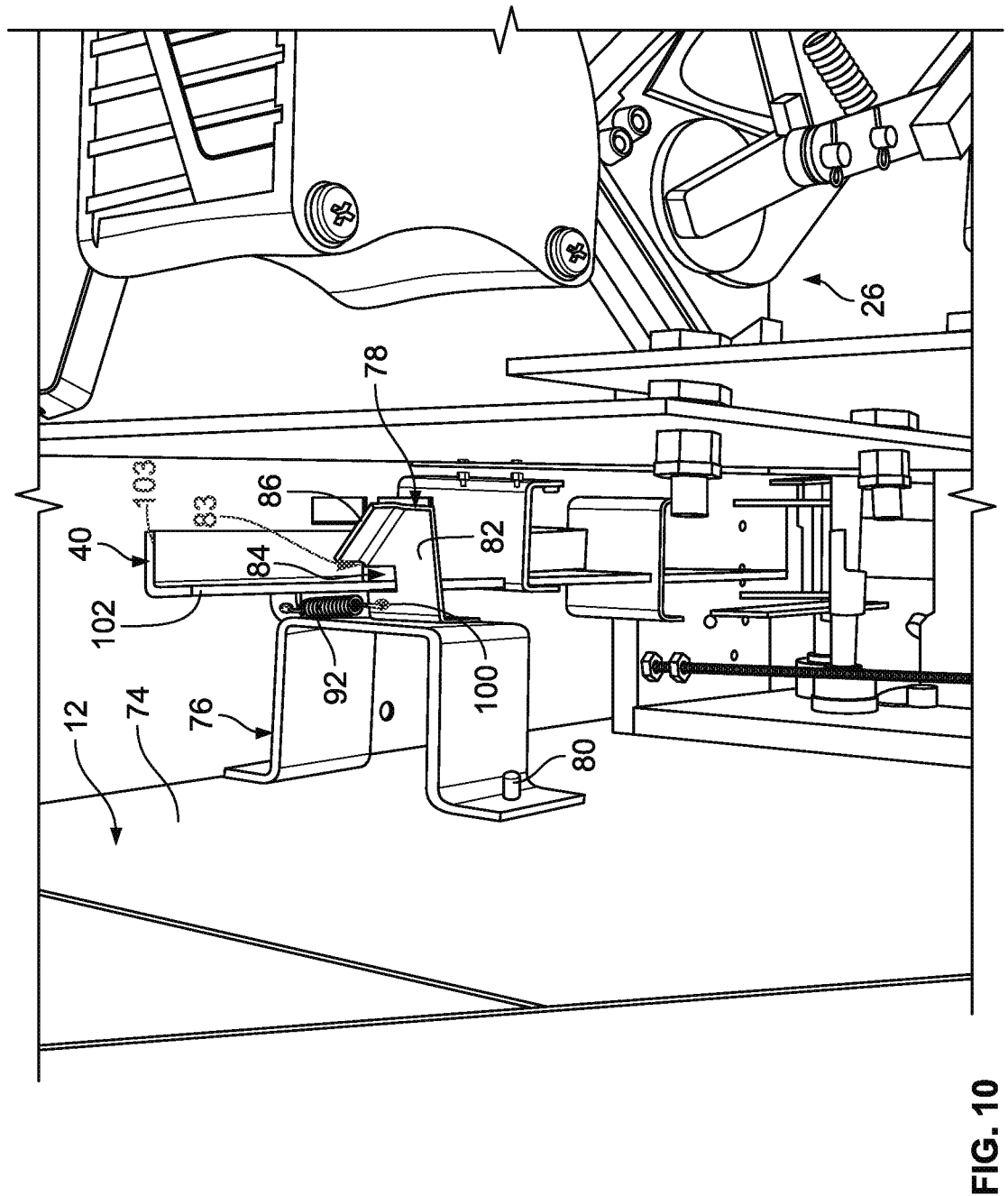
FIG. 10 illustrates the door assembly in unlocked engagement with the automatic interlock assembly in accordance with the principles of the present disclosure.
Figure 11:
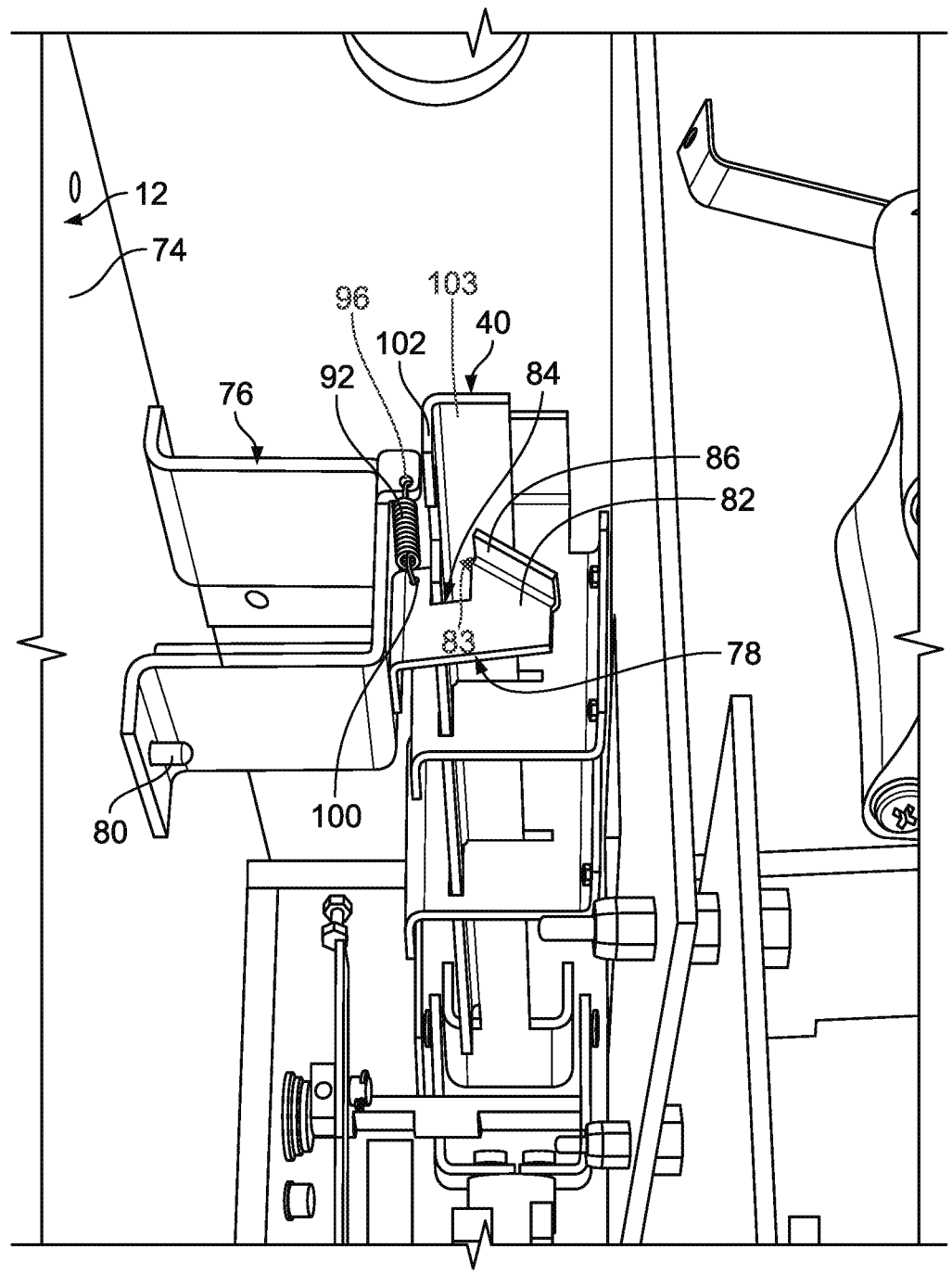
FIG. 11 illustrates the door assembly locked engagement with the automatic interlock assembly in accordance with the principles of the present disclosure.

When the access door 12 is closed as shown in FIG. 10, the hook bracket 78 can interface with the slider rod 40. Upon closing the unlocked access door 12, electrical switch assembly 24 is in the OPEN condition and the slider rod 40 is in the extended position. With the slider rod 40 in the extended position, the hook bracket 78 can be received within the opening 48 of the slider rod 40 when the access door 12 is shut. Once the door is shut, the electrical switch assembly 24 can be shifted to the CLOSED condition. Upon shifting the electrical switch assembly 24 to the CLOSED condition, the slider rod 40 moves from the extended position to the retracted position such that the hook bracket 78 is positioned at a top end of the opening 48 of the slider rod 40 and the first flat leg 102 of the slider rod 40 is received into the slot 84 of the hook bracket 78 to lock the access door 12. That is, the hook portion 83 of the hook bracket 78 is configured to interfere with the first flat leg 102 of the slider rod 40 to lock the access door 12. If personnel attempt to open the access door 12 while the electrical switch assembly 24 is in the CLOSED condition, the hook portion 83 is blocked by the first flat leg 102 such that the hook bracket 78 cannot be removed from the opening 48 of the slider rod 40, which prohibits personnel from opening the access door 12.

The trip device 22 can be activated to switch the electrical switch assembly 24 to the OPEN condition, which actuates the linkage 42 for moving the slider rod 40 to the extended position. As this occurs, the blocking portion of the first flat leg 102 of the slider rod 40 raises such that it is no longer obstructing the extension member 86 of the hook bracket 78 to allow the hook bracket 78 to freely move out of the opening 48 of the slider rod 40 for opening the access door 12.

There are circumstances in which authorized personnel (i.e., maintenance, etc.) may need to have access to the electrical equipment within the electrical cabinet 10 while electric current is running. In such cases, the access door 12 may be opened while not disconnecting the load by using a defeat mechanism. The defeat mechanism may include a separate tool that allows authorized personnel to defeat and unlock the access door 12 such that a power shut down can be avoided.

Figure 12:
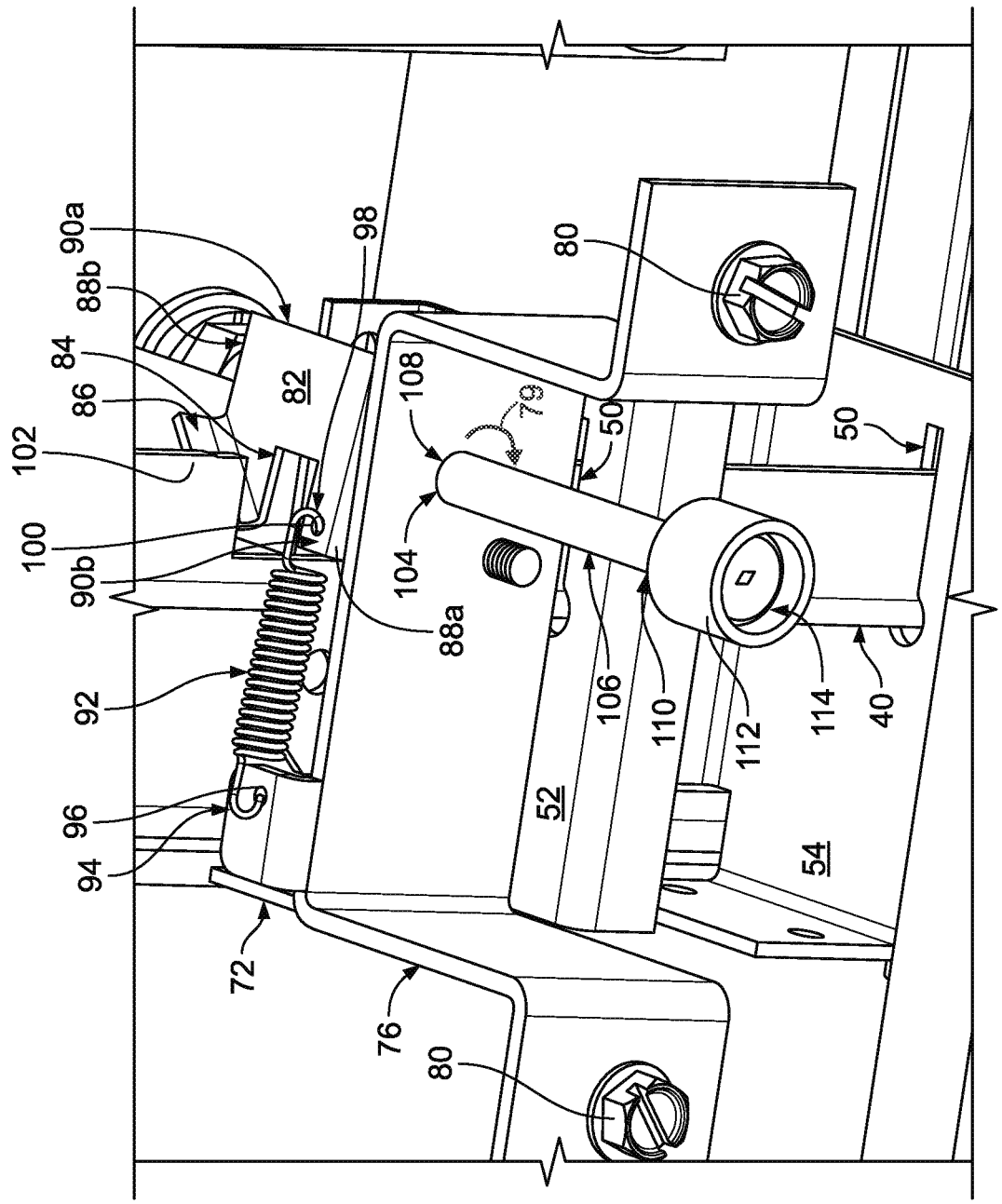
FIG. 12 illustrates an enlarged view of the door bracket and hook bracket of FIG. 8.
Figure 13:
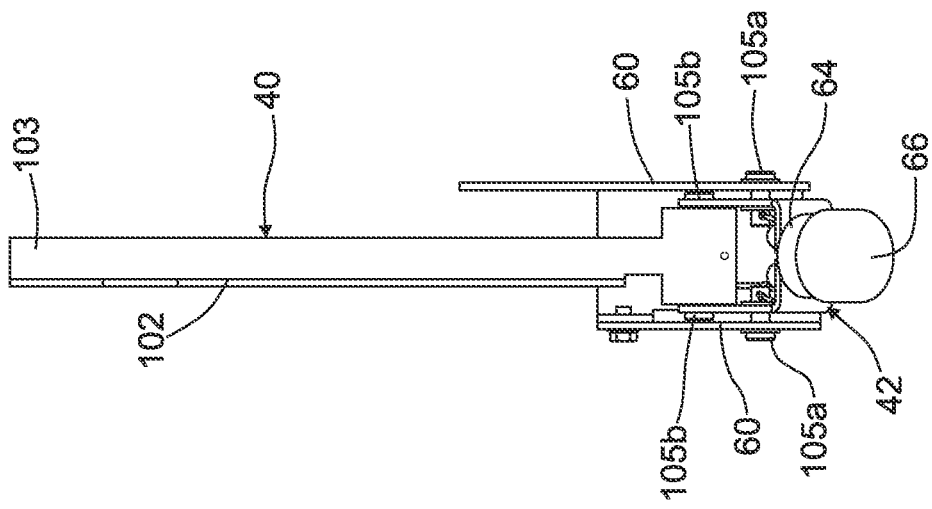
FIG. 13 illustrates a side view of a lock system in accordance with the principles of the present disclosure.
Figure 14:
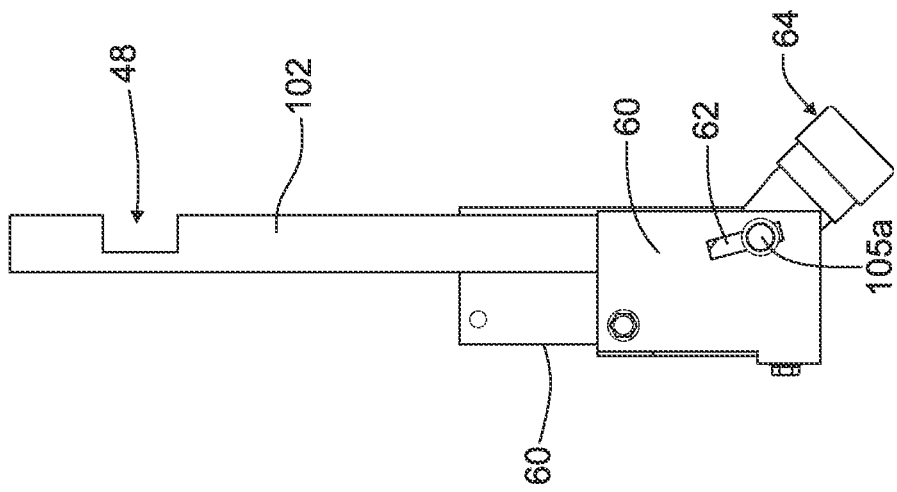
FIG. 14 illustrates a front view of the lock system of FIG. 13.
Figure 15:
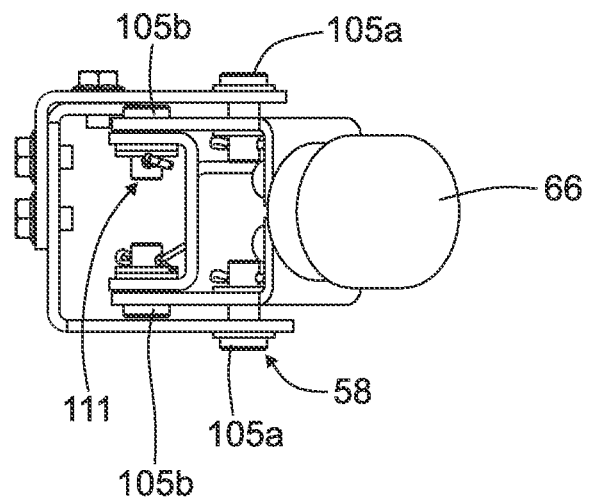
FIG. 15 illustrates a top view of the lock system of FIG. 13.
Figure 16:
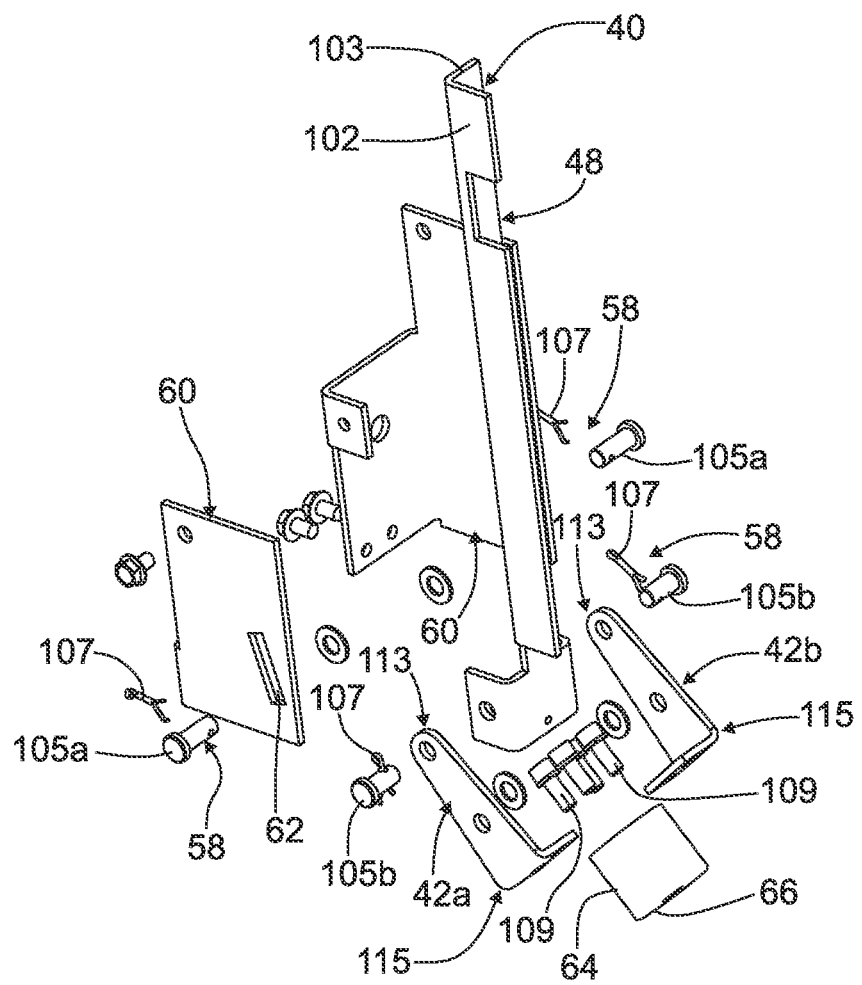
FIG. 16 illustrates an exploded view of the lock system of FIG. 13.

Referring to FIG. 12, the door bracket 76 defines a hole 104 through which the latch override actuator 106 (e.g., a rotatable shaft) passes in which the latch override actuator 106 can be rotated about the pivot axis 79. The latch override actuator 106 can have a first end 108 that is fixed to the hook bracket 78 and a second end 110 that includes a socket head 112 with a recess 114 shaped to receive a tool (not shown). Preferably, the tool and socket have a unique shape so as to provide a key function that allows only authorized personnel to open the lock system via the override actuator 106. The latch override actuator 106 can be rotated about the axis 79 to adjust the position of the hook bracket 78 about the axis 79 against the bias of the spring member 92. For example, the latch override actuator 106 can rotate the extension member 86 about the pivot axis to move the extension member 86 from a first orientation (e.g., a horizontal orientation) to a second orientation (e.g., an orientation angled relative to horizontal) in which the hook portion 83 is moved away from the blocking portion of the first flat leg 102 into alignment with the opening 48 of the slider rod 40 to allow the access door 12 to be opened. That is, the latch override actuator 106 can be rotated to rotate the hook bracket 78 within the opening 48 of the slider rod 40 which moves the extension member 86 away from the first flat leg 102 thereby defeating the automatic interlock assembly 36.

Another aspect of the present disclosure relates to a method of operating an automatic interlock assembly of an electrical cabinet. The electrical cabinet can have an access door and electric switches disposed in the electrical cabinet and a cam assembly interconnected with the electrical switches for imparting operating movement thereto. The method can include the following steps: 1) providing a lock system that includes a slider rod and an interlock block connected to the slider rod; 2) providing a door assembly that includes a door bracket and a hook bracket attached to the door bracket; 3) providing a multi-position arm interconnected with the cam assembly; 4) moving the cam assembly and the multi-position arm to a first position such that the electric switches are OPEN and the slider rod is held in an extended position by engagement of the multi-position arm with the interlock block, and where the hook bracket is movable relative to the slider rod; and 5) moving the cam assembly and the multi-position arm to a second position such that the multi-position arm disengages the interlock block and the slider rod automatically moves from the extended position to a retracted position and the electric switches are CLOSED, and where movement of the hook bracket is restricted by the slider rod.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. An automatic interlock assembly for use within an electrical cabinet including an access door, the electrical cabinet including contact switches and a switch actuator mechanism operatively interconnected with the contact switches to shift the contact switches between OPEN and CLOSED conditions, the automatic interlock assembly comprising:
   a lock system mounted in the electrical cabinet, the lock system including a slider rod and a linkage, the slider rod having a first end and an opposite second end, the slider rod being movable between an extended position and a retracted position;
   a multi-position arm mounted within the electrical cabinet and interconnected with the switch actuator mechanism, the multi-position arm being in releasable contact with the linkage of the lock system, the multi-position arm being operable between a first position and a second position that respectively correspond with the OPEN and CLOSED conditions of the contact switches; and
   a door assembly mounted on the access door, the door assembly including a door bracket and a hook bracket mounted to the door bracket, the hook bracket being received in an opening defined in the slider rod when the access door is closed;
   wherein, when the multi-position arm moves with the switch actuator mechanism from the CLOSED condition to the OPEN condition, the multi-position arm is in the first position to make contact with the linkage and pushes the linkage upward and holds the slider rod in the extended position, and the hook bracket is configured to move without obstruction within the opening of the slider rod such that the lock system remains unlocked; and
   wherein, when the multi-position arm moves with the switch actuator mechanism from the OPEN condition to the CLOSED condition, the slider rod and the linkage follow the multi-position arm downwardly as the multi-position arm moves to the second position and separates from the linkage to permit the slider rod to linearly move to the retracted position, and the hook bracket is restricted by a leg of the slider rod from moving out of the opening such that the lock system locks;
   wherein the linkage is positioned at the second end of the slider rod, the linkage being fixed to an interlock block such that the interlock block is in releasable sliding engagement with the multi-position arm.

2. The automatic interlock assembly of claim 1, further comprising a door handle for controlling the switch actuator mechanism and the multi-position arm between the OPEN and CLOSED conditions.

3. The automatic interlock assembly of claim 1, wherein the interlock block extends in a plane that is not parallel with the slider rod of the lock system.

4. The automatic interlock assembly of claim 3, wherein the interlock block and the slider rod are connected together at an angle of less than 90 degrees.

5. The automatic interlock assembly of claim 1, wherein gravity forces the slider rod to linearly move from the extended position toward the retracted position.

6. The automatic interlock assembly of claim 1, further comprising supporting brackets mounted to a frame of the electrical cabinet, wherein the linkage is pivotally connected to the supporting brackets.

7. The automatic interlock assembly of claim 6, wherein the linkage is pivoted about a pivot axis by at least one pin being slidable in slots defined by the supporting brackets.

8. The automatic interlock assembly of claim 1, wherein the slider rod is spring loaded for horizontal movement between the extended and retracted positions.

9. An interlock system for an electrical cabinet having an access door, electric switches disposed in the electrical cabinet, a cam assembly interconnected with the electric switches for imparting operating movement thereto, the interlock system comprising:
   a slider rod having a leg that defines a cutout adjacent a first end thereof, the slider rod being mounted within the electrical cabinet;
   an interlock block interconnected with the slider rod;
   a movable element interconnected with the cam assembly, the movable element being engageable with the interlock block; and
   a door bracket fixed to the access door, the door bracket including a hook bracket engageable with the cutout of the slider rod when the access door is in a closed position, the hook bracket having an extension member;
   wherein, when the cam assembly is actuated to operatively shift the electric switches from a CLOSED condition to an OPEN condition, the movable element moves with the cam assembly such that the movable element pushes the interlock block upward to slide the slider rod to an extended position, and the hook bracket is permitted to move in and out of the cutout of the slider rod for allowing the access door to be opened; and
   wherein, when the cam assembly is actuated to operatively shift the electric switches from the OPEN condition to the CLOSED condition, the movable element moves with the cam assembly such that the slider rod follows the movable element downwardly to a retracted position and the movable element separates from the interlock block, and the leg of the slider rod is configured to restrict the extension member of the hook bracket to prevent removal of the hook bracket from the cutout of the slider rod for locking the access door.

10. The interlock system of claim 9, further comprising a door handle for controlling the cam assembly and the movable element between the OPEN and CLOSED conditions.

11. The interlock system of claim 9, wherein the interlock block is positioned at a second end of the slider rod such that the interlock block is in releasable sliding engagement with the movable element.

12. The interlock system of claim 11, wherein the interlock block extends in a plane that is not parallel with the slider rod of the interlock system.

13. The interlock system of claim 12, wherein the interlock block and the slider rod are connected together at an angle of less than 90 degrees.

14. The interlock system of claim 9, wherein gravity forces the slider rod to move from the extended position toward the retracted position.

15. The interlock system of claim 9, further comprising supporting brackets mounted to a frame of the electrical cabinet, wherein the supporting brackets are pivotally connected to a linkage fixed to the interlock block.

16. The interlock system of claim 15, wherein the linkage is pivoted about a pivot axis by at least one pin being slidable in slots defined by the supporting brackets.

17. The interlock system of claim 9, wherein the slider rod is spring loaded for horizontal movement between the extended and retracted positions.

18. A method of operating an automatic interlock assembly of an electrical cabinet, the electrical cabinet having an access door and electric switches disposed in the electrical cabinet, and a cam assembly interconnected with the electric switches for imparting operating movement thereto, the method including:
   providing a multi-position arm interconnected with the cam assembly;
   providing a lock system that includes a slider rod and an interlock block connected to the slider rod, wherein a linkage is positioned at an end of the slider rod, the linkage being fixed to the interlock block such that the interlock block is in releasable sliding engagement with the multi-position arm;
   providing a door assembly that includes a door bracket and a hook bracket attached to the door bracket;
   moving the cam assembly and the multi-position arm to a first position such that the electric switches are OPEN and the slider rod is held in an extended position by engagement of the multi-position arm with the interlock block, and wherein the hook bracket is movable relative to the slider rod; and
   moving the cam assembly and the multi-position arm to a second position such that the multi-position arm disengages the interlock block and the slider rod automatically moves from the extended position to a retracted position and the electric switches are CLOSED, and wherein movement of the hook bracket is restricted by the slider rod.

19. The method of claim 18, wherein, when the multi-position arm is in the first position, the access door is unlocked, and when the multi-position arm is in the second position, the access door is locked.

20. An automatic interlock assembly for use within an electrical cabinet including an access door, the electrical cabinet including contact switches and a switch actuator mechanism operatively interconnected with the contact switches to shift the contact switches between OPEN and CLOSED conditions, the automatic interlock assembly comprising:
   a lock system mounted in the electrical cabinet, the lock system including a slider rod and a linkage, the slider rod having a first end and an opposite second end, the slider rod being movable between an extended position and a retracted position;
   a multi-position arm mounted within the electrical cabinet and interconnected with the switch actuator mechanism, the multi-position arm being in releasable contact with the linkage of the lock system, the multi-position arm being operable between a first position and a second position that respectively correspond with the OPEN and CLOSED conditions of the contact switches;
   a door assembly mounted on the access door, the door assembly including a door bracket and a hook bracket mounted to the door bracket, the hook bracket being received in an opening defined in the slider rod when the access door is closed; and supporting brackets mounted to a frame of the electrical cabinet, wherein the linkage is pivotally connected to the supporting brackets;

wherein, when the multi-position arm moves with the switch actuator mechanism from the CLOSED condition to the OPEN condition, the multi-position arm is in the first position to make contact with the linkage and pushes the linkage upward and holds the slider rod in the extended position, and the hook bracket is configured to move without obstruction within the opening of the slider rod such that the lock system remains unlocked; and wherein, when the multi-position arm moves with the switch actuator mechanism from the OPEN condition to the CLOSED condition, the slider rod and the linkage follow the multi-position arm downwardly as the multi-position arm moves to the second position and separates from the linkage to permit the slider rod to linearly move to the retracted position, and the hook bracket is restricted by a leg of the slider rod from moving out of the opening such that the lock system locks.

21. The automatic interlock assembly of claim 20, wherein the linkage is pivoted about a pivot axis by at least one pin being slidable in slots defined by the supporting brackets.

* * * * *